May 31, 1960

G. S. VERNAM 2,938,944

TELEGRAPH SYSTEM

Filed May 24, 1954

INVENTOR.
G. S. VERNAM

BY

ATTORNEY

G. S. VERNAM

2,938,944

TELEGRAPH SYSTEM

Filed May 24, 1954

INVENTOR.
G. S. VERNAM

BY *M. R. Marsh*

ATTORNEY

FIG. 9

INVENTOR.
G. S. VERNAM
BY
ATTORNEY

G. S. VERNAM

2,938,944

TELEGRAPH SYSTEM

Filed May 24, 1954

INVENTOR
G. S. VERNAM

BY
M. R. Marsh

ATTORNEY

United States Patent Office 2,938,944
Patented May 31, 1960

2,938,944
TELEGRAPH SYSTEM

Gilbert S. Vernam, Hackensack, N.J., assignor to The Western Union Telegraph Company, New York, N.Y., a corporation of New York Filed May 24, 1954, Ser. No. 431,632

11 Claims. (Cl. 178—2)

This invention relates primarily to telegraph switching systems and more particularly to telegraph reperforator switching systems of the general type disclosed in U.S. Patents Nos. 2,587,253 and 2,632,044 to Gilbert S. Vernam and George G. Light, respectively. In these types of telegraph switching systems telegraph messages received at a switching center control signal responsive receiving mechanisms, one such mechanism usually for each incoming line, to store the received messages in perforated tapes. In addition to perforating the tapes, the signal responsive mechanisms print the received characters thereon. These signal responsive mechanisms are usually called printer-perforators and each has individually associated therewith a tape transmitter for sensing the tape and transmitting the stored signals.

When a message is received, an operator reads the destination of the message on the tape and through push button controlled switching mechanisms connects the associated transmitter to the desired outgoing circuit.

In some instances, such as for example, where one switching center is connected to another, it may be necessary to provide a number of outgoing channels to the same destination, and such channels are usually called multichannel groups.

Heretofore and particularly in the systems disclosed in the above-identified patents each channel outgoing from a switching center had associated therewith a corresponding push button at each of the switching or so-called operating positions. Accordingly each multichannel destination had a corresponding number of push buttons and this number was duplicated at each switching position.

In view of the above it is one of the primary objects of the present invention to provide an improved switching system of the above general type wherein a plurality of channels to a single destination are represented by a single push button in the push button panel at an operating position. Thus the number of push buttons at each switching or operating position is reduced and the transmission of a message to a multichannel destination is simplified in that the attendant merely depresses a single push button to initiate the automatic selection of an idle channel to the multichannel destination.

Another object of the present invention is the provision of an arrangement incorporating the above feature and wherein a single channel or a group of multichannels to a single destination may be readily expanded by adding additional channels thereto. In this respect a more specific object of the invention is to provide an arrangement to a common destination whereby additional channels may be added to one or a group or subtracted from a group by merely patching or removing the patch cords of separate units of channel equipment.

In this connection a more detailed object of the invention is to provide an arrangement which is extremely flexible in meeting the needs of the switching center.

A still further object of the invention is to provide an arrangement for multichannel groups to a common destination wherein the individual channels of a group can be selected on a rotational basis or on a priority basis. In the latter case the lowest numbered idle channel is selected if idle when a message is transmitted to the common destination.

The above and further objects of the invention will be more apparent from the following detailed description in which reference is made to the accompanying drawings wherein.

Figure 1:
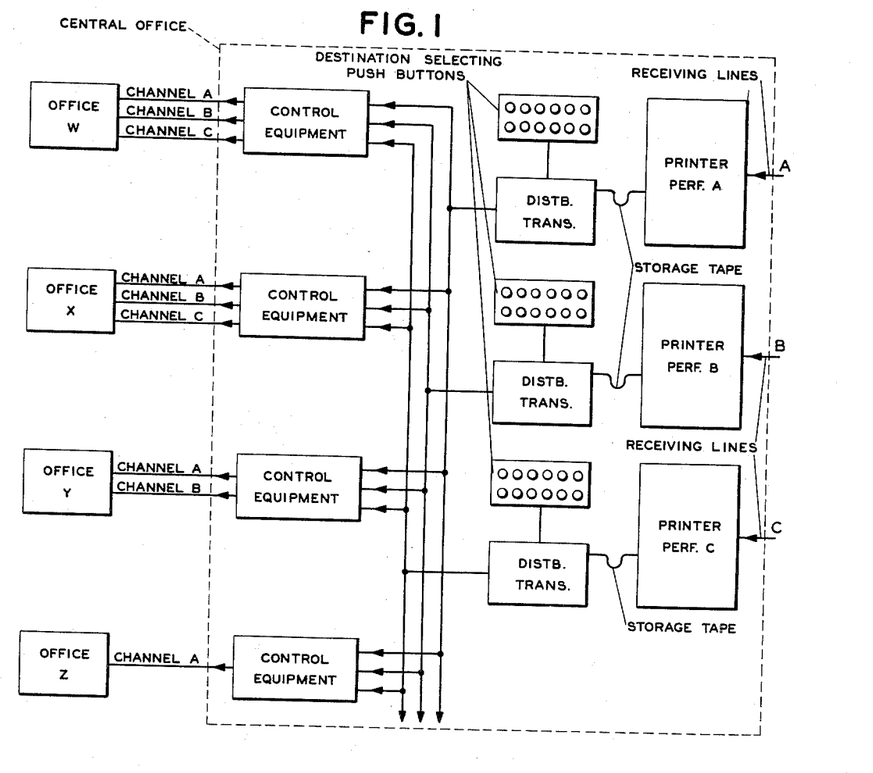
Fig. 1 is a diagrammatic view of the general arrangement of a system embodying the present invention.
Figure 2:
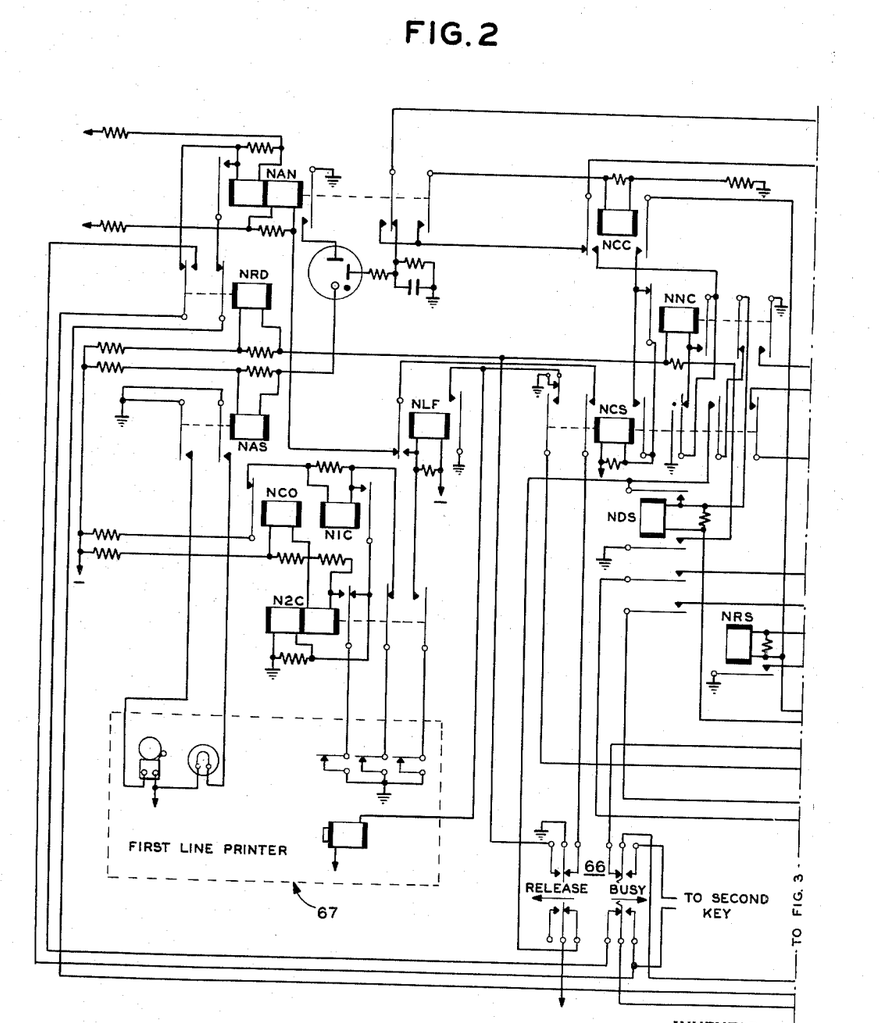
Figs. 2, 3, 4 and 5 are detailed circuit diagrams of a sending channel equipment.
Figure 3:
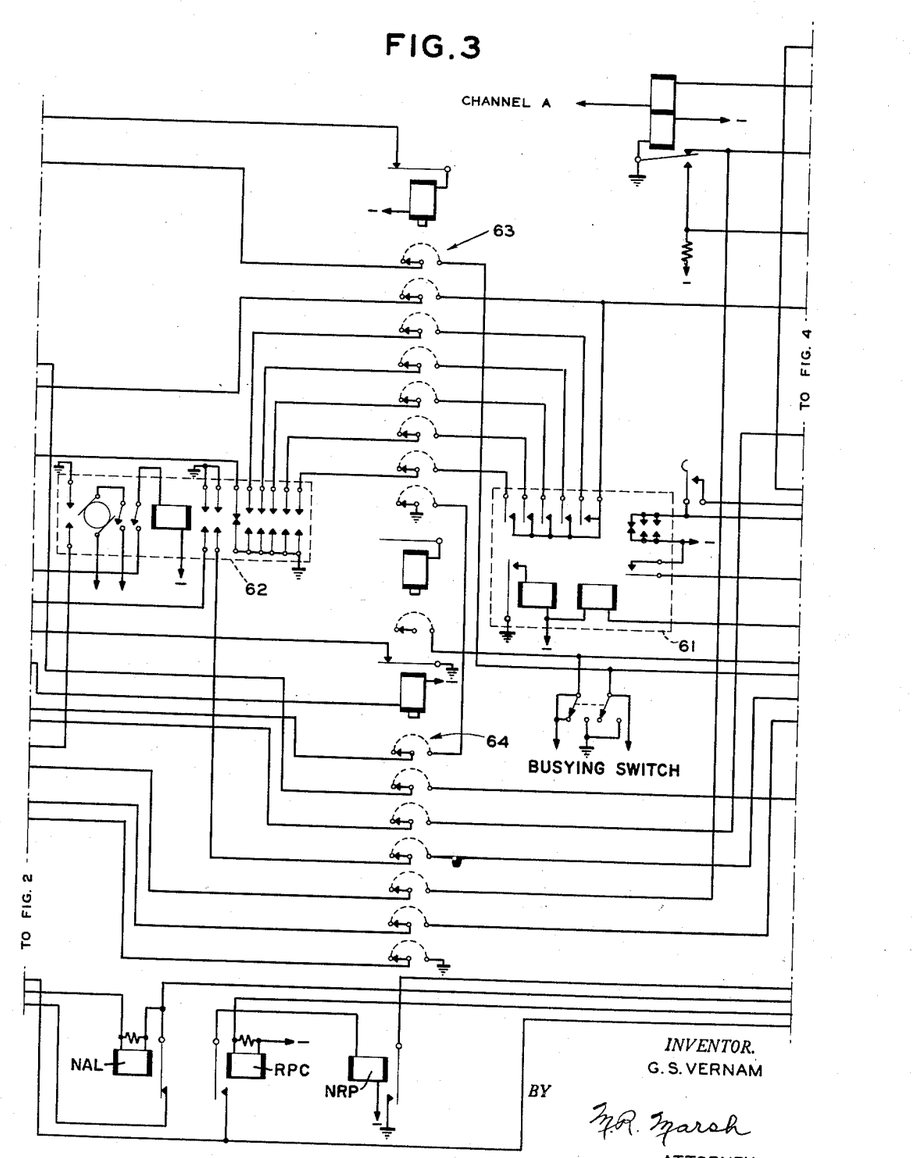
Figure 4:
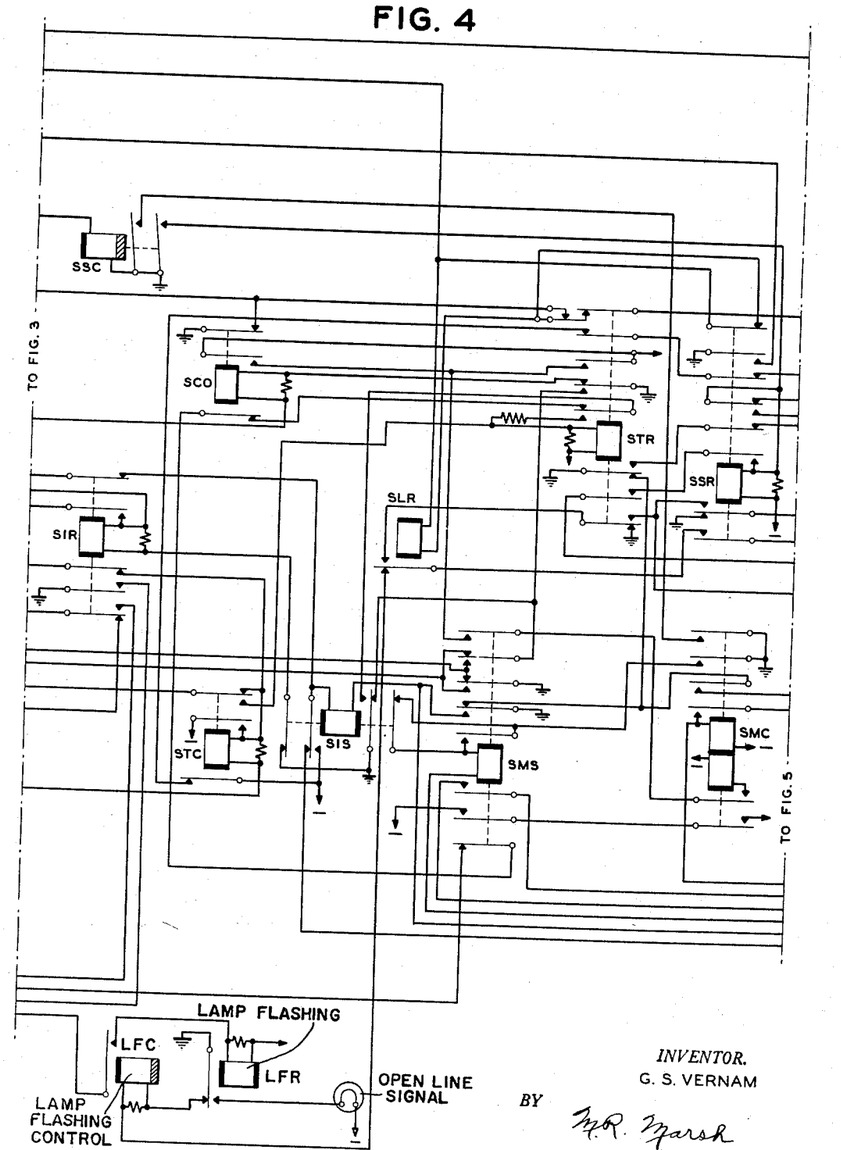
Figure 5:
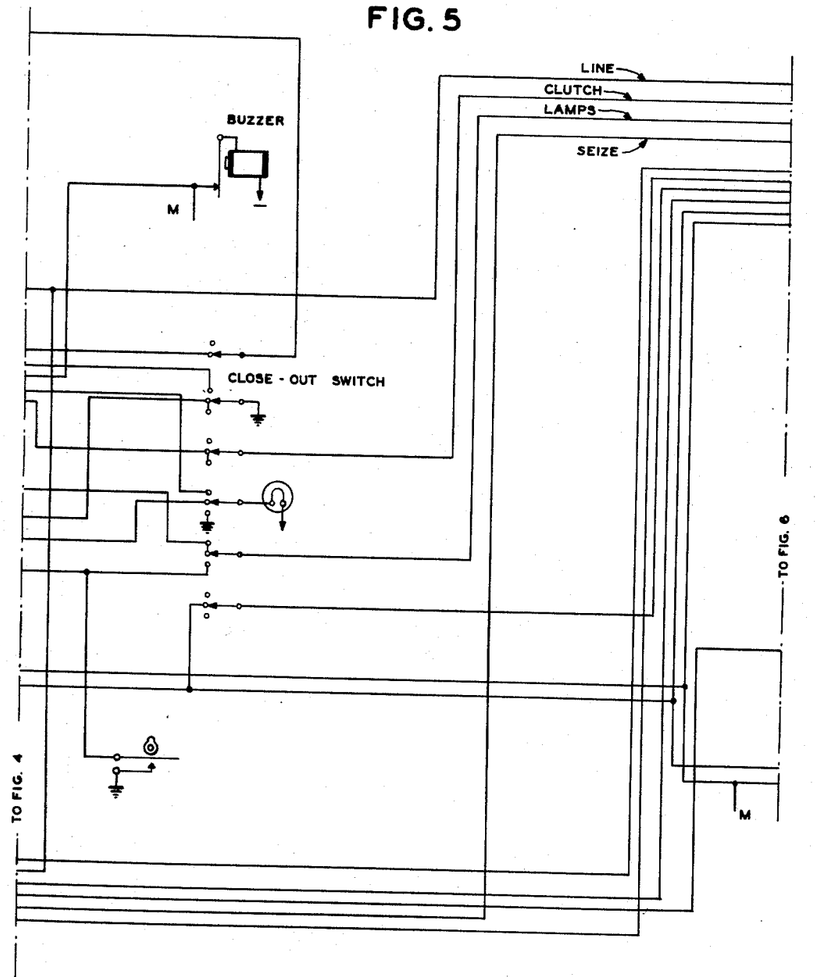

In Fig. 1 the central office is illustrated as having three receiving or incoming lines A, B and C which terminate in associated printer-perforators whereby incoming messages are stored in storage tapes. The storage tapes issuing from the printer-perforators feed to associated distributor transmitters to control the same and also associated with each distributor transmitter is a panel of destination selecting push buttons. Each distributor transmitter is connected in multiple to control equipment assigned to each remote destination to which messages are to be switched. In Fig. 1 these remote destinations are represented as offices W, X, Y and Z with three channels of communication A, B and C to offices W and X, two channels A and B to office Y, and one channel A to office Z. Thus offices W, X and Y are termed hereinafter multichannel destinations, whereas office Z is a single channel destination.

When a message is received and stored in the storage tape, the attendant notes the destination and pushes an appropriate destination selection push button, of which there is one for each destination at each printer-perforator and distributor-transmitter position. Since there is but one selecting push button for each destination and some of these are multichannel destination offices, the control equipment functions to transmit the message over any one of the channels to the remote office. Even though there are three channels to destinations represented by offices W and X, each will have a single representative selecting push button in each operating position and thus the number of push buttons in a panel is a minimum. Furthermore, the operator is not required to test one or more single channel representing push buttons when transmitting a message to a multichannel destination. The control equipment, of which there is one set associated with each destination, is so arranged that in a multichannel destination the channels may be employed in rotational order, or by operating switches the channels are selected in a preferential order. A more complete description of the operation of a system embodying the features of the present invention is given in the following detailed description thereof.

Figure 11:
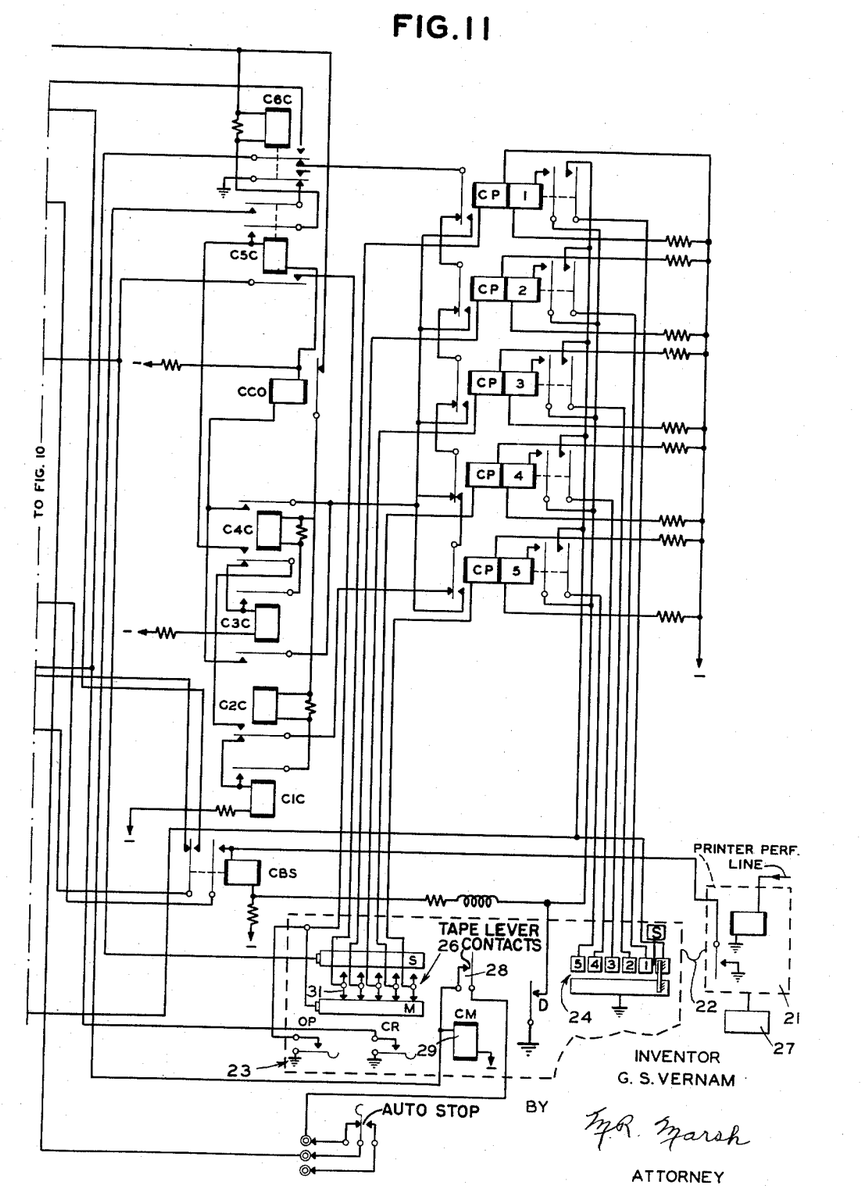
Figure 12:
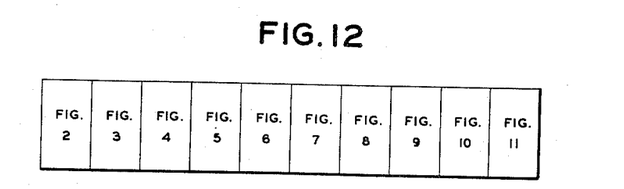
Fig. 12 illustrates the manner in which Figs. 2 to 11 may be arranged to produce a complete illustrative circuit arrangement of a system embodying the present invention.

Referring now to the drawings, each incoming line channel or circuit, as shown in detail in Fig. 11, terminates in a printer-perforator 21 and the incoming signals control the same to perforate a tape 22 in accordance with the received signals. The tape 22 issuing from the printer-perforator 21 feeds to an associated distributor transmitter indicated generally by reference numeral 23, which includes a distributor unit 24 and a transmitter unit 26, as well as a series of contacts and other equipment hereinafter described.

The printer-perforator 21 may have associated therewith an automatic tape feedout unit 27 which controls the perforator at the end of a message and the cessation of signals to feed out a metered length of tape so that the messages are separated in the tape by non-message sections. In the embodiment of the invention disclosed herein the tape feedout characters are letters wherein each of the five code positions is perforated.

After the passage of a message in the tape through the transmitter 26, and assuming the tape lever contacts 28 are closed indicating a loop of tape between the printer-perforator 21 and distributor transmitter 23, the following letter characters in the tape are idled through the transmitter until the first character of the next message appears over the pins thereof. As long as the letter codes in the tape 22 appear over the pins of the transmitter 26, the clutch magnet 29 of the distributor transmitter remains energized to maintain the distributor transmitter in operation and advance the tape one step for each cycle of operation thereof. When the first character of the message, which will have one or more pulses thereof spacing, is sensed by the transmitter 26, a circuit is completed for the operation of the message waiting relay CMW as timed by the operating contacts OP and CR of the distributor transmitter. This circuit extends from ground at contact CR through the coil of relay CMW, a back contact of relay CSR, the spacing bus bar S of the transmitter 26 and one of the tongues 31 of the transmitter and the coil of its associated CP or pulse relay to potential. Each tongue 31 of the transmitter is associated with one of the pulse relays CP1 to CP5. In conjunction with the operation of the message waiting relay CMW, the clutch magnet 29 is released to stop the distributor transmitter and at this time the first character of the message in the tape 22 will be over the pins of the transmitter 26. The operation of relay CMW also completes a circuit from ground through back contacts of relays CLS-1, CLS-2, CLS-3, CBS, and message waiting lamp 32 to potential. Lighting of the message waiting lamp 32 calls to the attention of the operator that a message or a part thereof is in the tape 22 waiting to be switched.

The operator thereupon inspects the tape 22 to determine the destination of the message and it will be assumed that it is intended for a remote destination having a plurality of channels extending thereto or what is termed a multichannel destination. It will further be assumed that the push button 33 at the operating position represents the destination of the message and the operator depresses the same. It will be understood that there is a push button, such as 33, at each operating position and that a number of the common control and operating circuits cooperating therewith are multipled to each operating position as well as to various other units of equipment. In this respect the present system is similar to the systems disclosed in the above mentioned patents where certain control circuits similar to some of those disclosed herein are described in detail, and the said patents are referred to for a more detailed description of some of the circuits shown. Some of the points at which the multiple connections are made are believed to be obvious and others are indicated by the letter M in the drawings.

The operation of push button 33 completes a circuit from ground thereat through the coil of relay CSC-2, the make-before-break contact 34 thereof and back contacts of relays CLS-1, CLS-2, and CLS-3 to potential at 36. As relay CSC-2 operates, it locks up through the contacts 34 to potential at 37. The operation of relay CSC-2 also completes a circuit from ground through back contacts of relay CRS, make contacts of relay CSC-2, the coil of step magnet 38 of rotary switch 40 to potential. As the step magnet 38 is energized, contacts 39 thereof close to complete a circuit from ground through the left hand coil of relay CRS to potential to energize the same whereby the circuit to the step magnet 38 is interrupted and it releases.

The release of the step magnet 38 advances the wipers of the rotary switch 40 and the contacts 39 in opening interrupt the circuit to relay CRS. Such energization and release of relay CRS and step magnet 38 continues until the No. 1 wiper of rotary switch 40 reaches a point that is grounded by the lower contacts of the push button 33. When the No. 1 wiper reaches this point, a circuit is completed from the ground thereat through the lower coil of relay CLS-2, make contacts of relay CSC-2 and the right hand coil of relay CRS to potential. Relay CRS is thus held operated to maintain interrupted the circuit through the step magnet 38 of the rotary switch whereupon the rotary switch stops with the wipers thereof on the points corresponding to the grounded point of the No. 1 level, or the points representing the push button 33.

The described circuit through the lower coil of relay CLS-2 operates the same, and in operating this relay locks up through its upper coil to ground through a back contact of relay CDR. As relay CLS-2 operates, the circuit to the message waiting lamp 32 is interrupted whereby the lamp ceases to glow and a circuit from potential through a standby lamp 41, a back contact of relay CDD and make contacts of relay CLS-2 is completed, causing the said standby lamp to light. At the same time a neon lamp 42 has the circuit thereto completed causing it to glow. It will be noted that various of the above described circuits extend through back contacts of the other CLS relays whereby only one of the said relays can be operated at a time.

The lighting of the neon lamp 42 adjacent the push button 33 indicates to the attendant that the push button can be released, and the release thereof interrupts the circuit to relay CSC-2.

In brief review, the operation of the equipment up to this point in conjunction with the receipt of a message by the printer perforator 21 is as follows. As the message is stored in the tape 22, the letter characters preceding the message are idled through the transmitter 26 until the first character of the message reaches the pins. At this time the distributor transmitter 23 is stopped and the message waiting relay CMW operated to complete a circuit to the message waiting lamp 32. The operator then inspects the tape to determine the destination of the message and assuming the destination is represented by the push button 33, the operator depresses this button which grounds a point on the No. 1 level of rotary switch 40 and completes a circuit for advancing the wipers of the rotary switch to this point. When the wipers of rotary switch 40 reach the grounded or marked point, relay CLS-2 operates and the message waiting lamp 32 is extinguished and the standby lamp 41 and the neon lamp 42 adjacent the push button 33 is lighted. The push button 33 may now be released.

It was heretofore assumed that the message in the tape 22 waiting to be transmitted by the transmitter 26 is intended for a destination having a plurality of channels thereto and that the push button 33 represented the multichannel destination. The principal parts of so-called transmitter finder equipment associated with one of the channels to the multichannel destination such as channel A is shown primarily in Figs. 9, 10 and 11, and the other channels to the common destination have similar arrangements of equipment represented by the rectangles 43 and 44 of channels B and C, respectively. The duplicate equipment of channels A, B and C are associated with one another by means of patching cords such as 46 and 47, and by means of the patching cords and jacks associated with the equipment additional channels to a multichannel destination may be readily added to meet greater demands and the number of channels to a common destination may also be readily reduced. By means of the patching cords such as 46 and 47, certain of the circuits are looped through the equipment assigned to the various channels.

The equipment controlling the sending channels to the multichannel destinations such as that represented by the channels A, B and C, as well as the other sending channels at a switching center may be similar or equivalent to that shown associated with the sending circuits in the above-mentioned patents. Such equipment includes automatic numbering machines which inject ahead of each message transmitted from the switching center information containing message and channel identifications as well as monitor type printers, each one of which may be common to a plurality of channels for recording certain parts of each message transmitted from the switching center. The sending circuits or channels may also have so-called master sending means whereby the text of desired messages may be transmitted simultaneously to a plurality of destinations. The circuits for the above equipment include a number of relays and some of the control circuits for the equipment herein described extend through certain contacts and/or assist in the control of some of these relays.

With a channel such as channel A of the multichannel group idle its relay FCA will be energized. The circuit for relay FCA is from ground through the coil thereof and back contacts of relays SIS, SIR, SSR, STR, STC, in the order named of the sending channel equipment, to potential. With relay FCA energized, a circuit is completed for the operation of relay FPC from potential through the coil of said relay, a front contact of relay FCA to ground. Relay FPC in its operated condition completes a locking circuit for itself and completes a circuit for the operation of relay FTR. When a relay such as FTR is operated, it indicates that its associated channel equipment is idle. Should channel A be busy, relay FTR will be released and various circuits normally extending into the channel A equipment to control the same are, by means of back contacts of relay FTR and the patching cord 46, extended to the B channel equipment. If the B channel equipment is busy, a similar relay and patching cord 47 extends these circuits into the C channel equipment.

Figure 6:
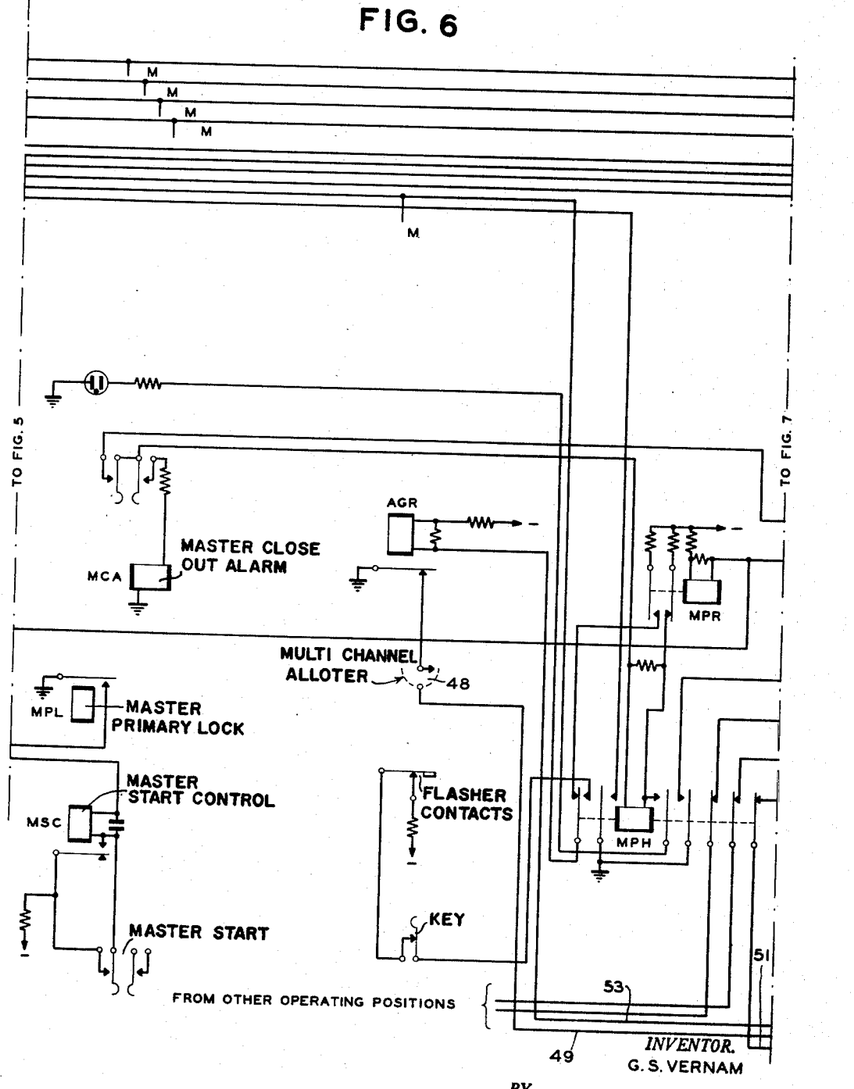
Figs. 6, 7 and 8 are detailed circuit diagrams of the control and transmitter finding equipment.
Figure 7:
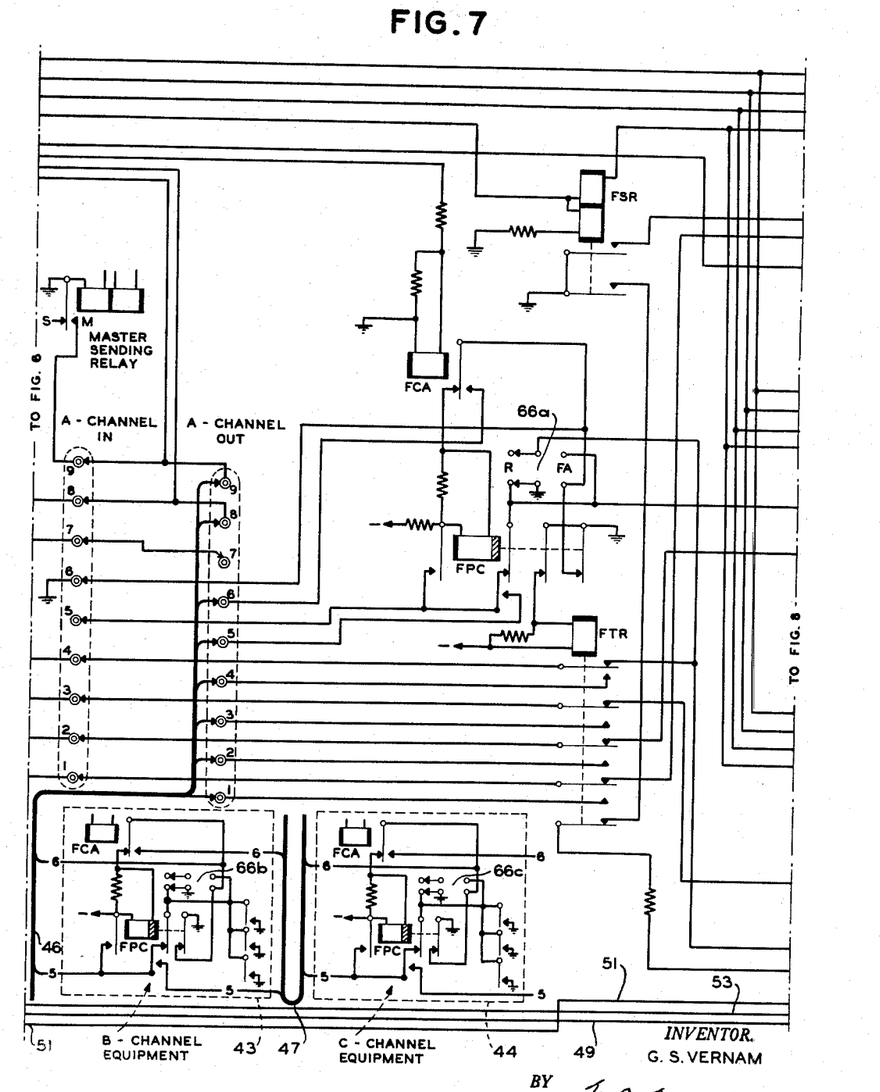
Figure 8:
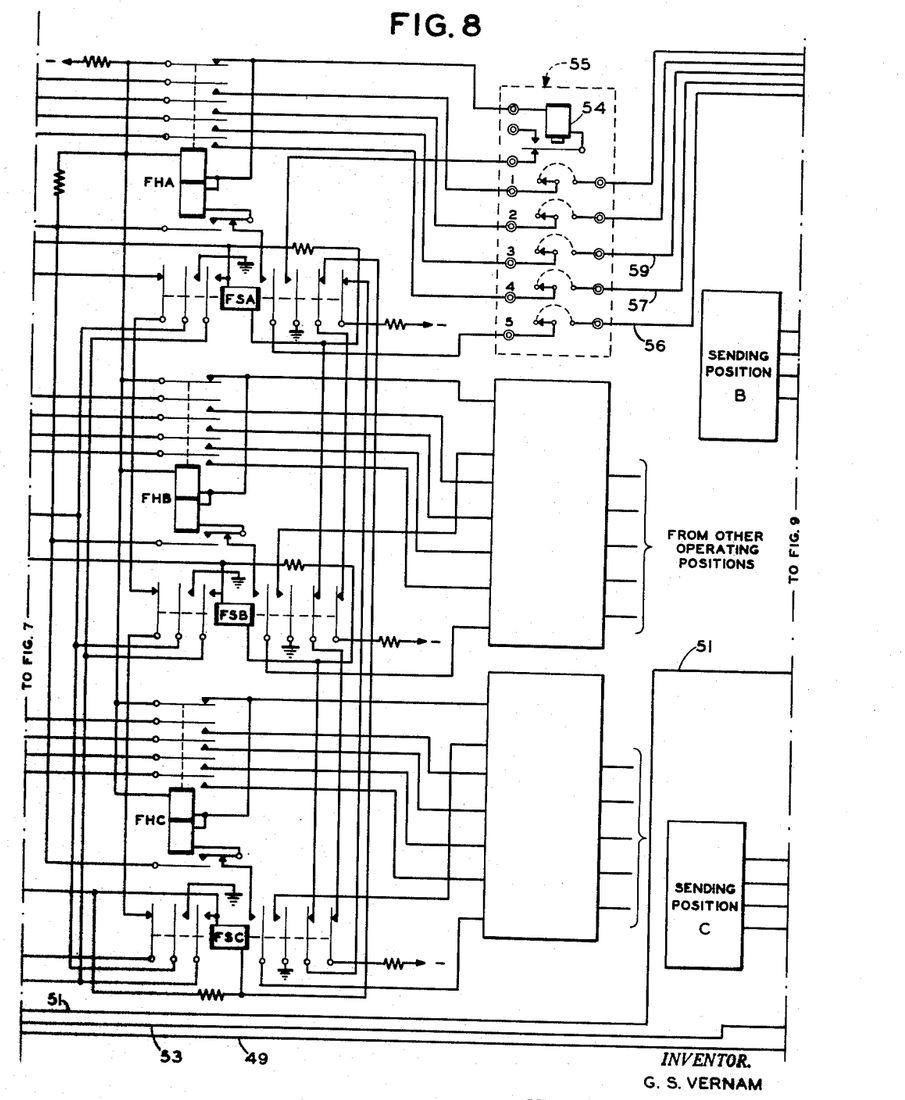

As in the previously mentioned patents, an allotter arrangement is employed for connecting the transmitting equipment to the sending channels one at a time to prevent the seizure of a channel by more than one transmitter. A similar allotter arrangement is employed in conjunction with groups of the multichannel circuits, and essentially the allotter consists of a means for sequentially and periodically applying a ground to the start leads of each of the operating positions. The above-mentioned ground extends through a back contact of relay AGR, Fig. 6, the wiper of the allotter 48 and over individual conductors such as 49 to a front contact of the message waiting relay CMW of individual operating positions. When relay CMW is operated, the allotter ground circuit is extended through the coil of the associated CFR relay, a back contact of associated CDD relay, a front contact of associated CLS-2 relay, to a wiper of the rotary switch 40. At this time the wipers of rotary switch 40, assuming the push button 33 has been operated and released, will be resting on points corresponding to the point marked by the push button 33. Thus the allotter ground is extended therethrough to a start lead such as 51 extending through a back contact of relay MPH to a tongue of relay FTR. As stated, with channel A idle, relay FTR will be energized and the allotter ground is continued through a front contact thereof and the coil of relay FSA and back contacts of relays FSB and FSC to potential. Thus relays FSA and CFR are operated. Where the requirements at a central switching office are such that a single rotary switch such as 55 can not accommodate all the operating positions, additional rotary switches and control relays may be employed as indicated in the drawings.

As relay CFR operates, a shorting ground is removed from the transmitter finder request lamp 52 whereby the lamp lights to indicate that a request is being made for a multichannel destination. Relay CFR in operating also completes a circuit from ground thereat, over a conductor 53, through the coil of relay AGR, to operate the same. The relay AGR in operating removes the ground from the allotter 48 and thus prevents other start lead circuits of the allotter from closing at this time or, as will be set forth, until a circuit has been established from the operating position through the finder rotary switch to the desired sending channel or to channel A in the case under consideration. In addition, relay CFR in operating through its upper tongue and front contact applies a ground to conductor 56 to mark a point on the lower level of rotary switch 55.

As a relay such as FSA operates, it completes a circuit from ground through the step magnet 54 of the rotary switch 55 associated therewith to potential to energize the step magnet which interrupts its own operating circuit and thus self-steps until the lower wiper thereof reaches the marked point grounded by the lead 56. At this time relay FHA operates and interrupts the circuit to the step magnet 54. As relay FHA operates the line, clutch, lamps and seize circuits are extended from the operating position having the message to transmit to the sending channel equipment of channel A. At this time the seize circuit is completed from potential through back contacts of relays STC, STR, SSR, SIR, the coils of relays SIS and FSR, front contacts of relay FHA, a level of rotary switch 55 to the seize lead 57 of the operating position and through a back contact of relay CDR and the two coils of CSR relay to ground at a front contact of operated relay CLS-2. Relay CSR thereupon operates and opens the circuit to relay CMW causing it to release.

As the seize circuit including conductor 57 is completed through the coils of relay CSR, the said relay operates and supplies a ground for holding itself operated. In the sending channel equipment the seize circuit, as described, extends through the coils of relays SIS and FSR causing these relays to operate. Relay FSR in operating, applies a holding ground for relay FHA and shorts the coil of the rotary switch step magnet 54. As relay SIS operates, the operating circuit through contacts of relays SIR, SSR, STR and STC is shunted and the circuit holding relay FCA is interrupted. Relay FCA thereupon releases and opens the circuit to relay FPC which in turn releases and opens the circuit to relay FTR which also releases. The release of relay of FTR extends certain of the circuits for controlling the A channel equipment to the B channel equipment. Thus, while channel A is busy, if a request is made for a circuit to the same destination, channel B will be selected if it is idle and if it is busy, channel C will be selected if idle. If all the channels to a destination are busy at the time a request for a channel is made, the first to become idle is selected.

Figure 9:
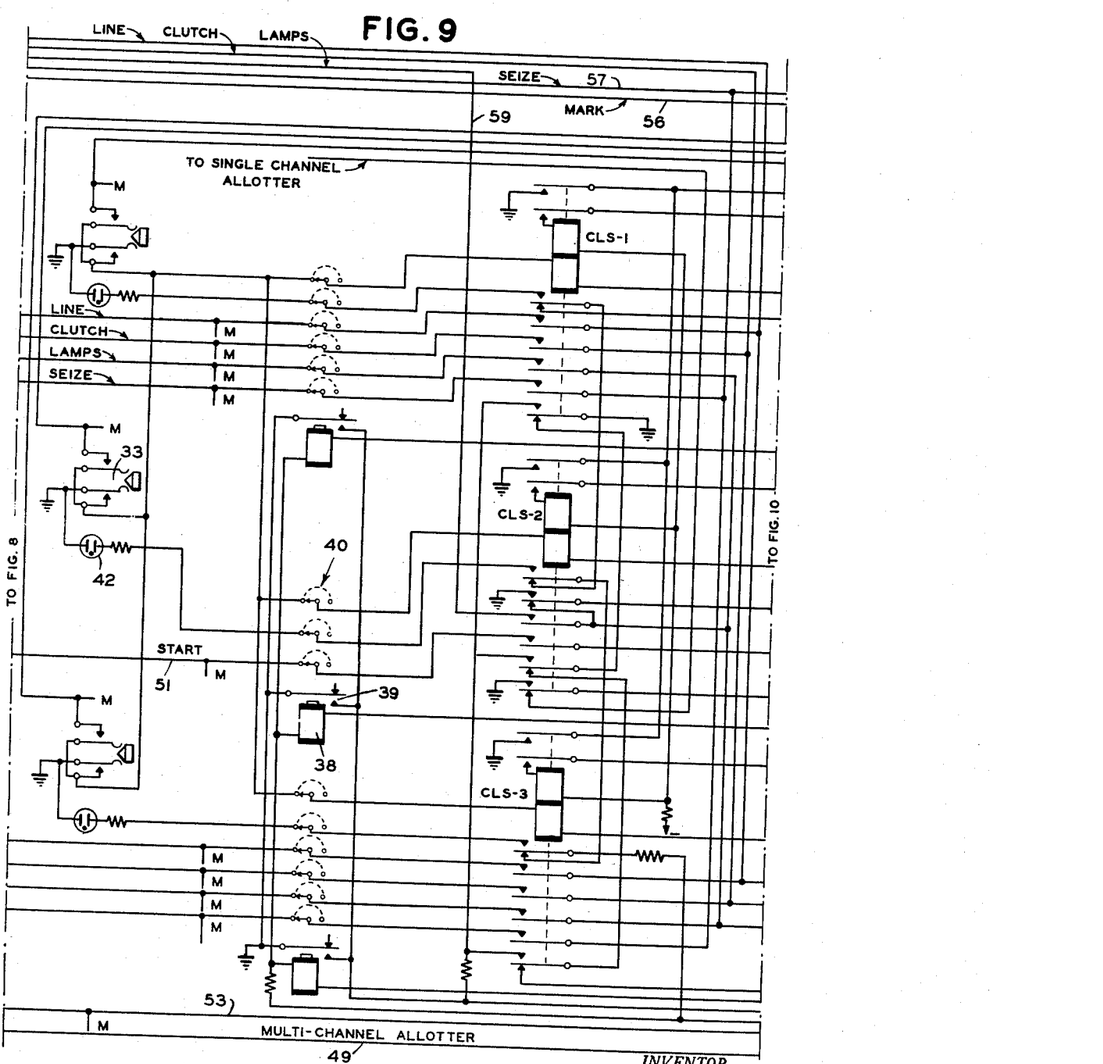
Figs. 9, 10 and 11 are detailed circuit diagrams of the receiving or operating position equipment.
Figure 10:
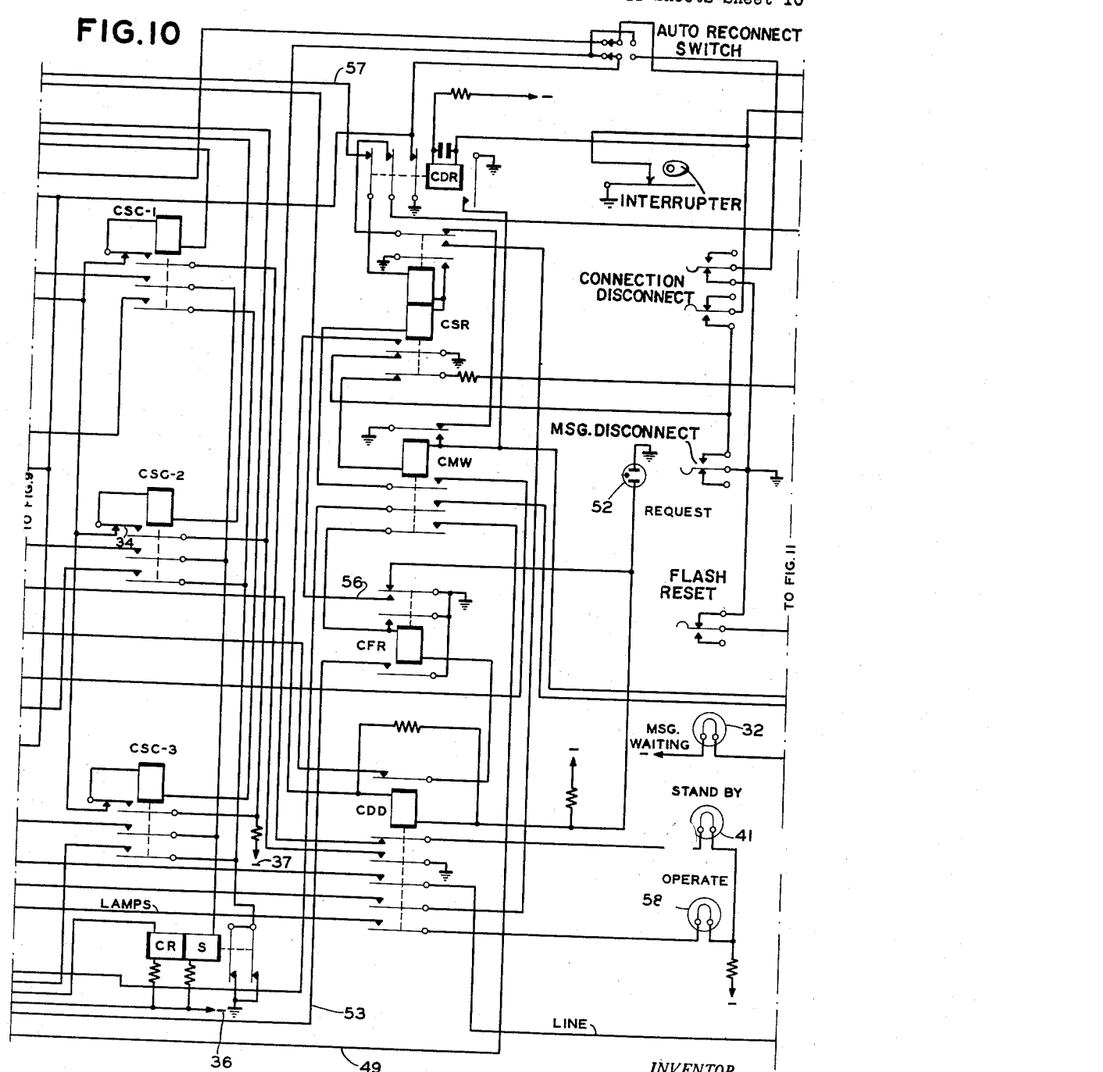

Returning now to the operating position represented by Figs. 9, 10 and 11, the operation of relay CSR completes a circuit through the coil of CDD to operate the same. As relay CDD operates, it interrupts the circuit holding relay CFR operated and at this time the release of relay FTR opens the circuit to relay FSA.

As relay CDD operates, the circuit to the standby lamp 41 is interrupted whereupon the lamp is extinguished and the release of relay CFR causes the finder request lamp 52 to be extinguished. In addition to the above, the release of CFR opens the circuit including conductor 53 to relay AGR which releases and again applies ground to the rotating element 48 of the multichannel allotter. As relay CDD is operated, a circuit is completed from battery through a transmitter operate lamp 58, a front contact of relay CLS-2 to the lamp lead 59 which at this time extends through a point and wiper of rotary switch 55, a front contact of relay FHA, to ground at a back contact of relay SSR. Thus the transmitter operate lamp 58 is lighted to indicate that a connection has been made to a sending channel.

Conditions are at this time established for transmission by the sending channel equipment of the automatic message number to the selected outgoing channel. The numbering machine 61, consisting of a plurality of contacts which automatically control the transmission of consecutive message numbers ahead of each message along with other information, operates in conjunction with a distributor 62. The distributor 62 is associated with a number of numbering machines such as 61 and switching equipment including rotary switches 63 and 64 enable the distributor 62 to be selectively associated with one numbering machine at a time. The numbering machine 61 is initiated into operation as a result of the energization of relay NAN, the circuit of which was completed by the operation of relay SIS. This circuit extends from ground through a front contact of relay SIS, back contacts of relays STR, SCO, SMS and NAL, a closed contact of the busy key 66, a back contact of relay NRD and the operating coil of relay NAN to potential.

Following the operation of NAN, relay NAL is energized and the rotary switch 63 advances to connect the sending line desiring the connection to the distributor 62 which in the case under discussion will be the line or channel associated with numbering machine 61. After the rotary switch 63 steps to the desired point relay NRS energizes to complete a circuit to the step magnet of rotary switch 64. As the step magnet of rotary switch 64 releases, relay NRS releases and the two operate and release until the wipers of switch 64 reach points corresponding to the setting of rotary switch 63. Thereupon relay NCS operates and connects the sending channel such as A to the distributor transmitter 62.

Relays SCO and NDS operate next to connect the first line printer 67 into the sending circuit. Relay NDS also completes a circuit to the clutch magnet of the distributor 62 whereupon it begins to operate and send the number and other information set up by the numbering machine 61 to the monitor printer 67 and the sending channel A. Relay NNC operates and the numbering machine 61 steps after the transmission of each character. Soon after the operation of relay NNC, relay NRD operates and relay NAL releases to transfer the initiate lead to the next numbering distributor circuit.

After the eleventh digit is transmitted from the numbering machine 61, relay STC operates and after the twelfth digit relay STR operates and relays SCO and NDS release. Operation of these relays completes a circuit to the clutch magnet of distributor 23 and interrupts the circuit of the clutch magnet of distributor 62 to stop the same. With the clutch magnet of distributor 23 operated and the spaced bus bar 26 connected to the sending channel, the message stored in the tape 22 will be transmitted to the sending channel.

At this time the first line printer 67 is associated with the sending channel such as A to copy all signals transmitted and is arranged to be disassociated therefrom after the transmission of the first line of the message. This is effected by the operation of relays N1C, N2C, NLF and NCO in conjunction with the transmission of a carriage return character and a line feed character at the end of the first line of the message. Through the operation and release of the above enumerated relays as well as the release of relay STC, the circuits associated with the numbering machine 61 and distributor 62 are all released and circuits are conditioned to detect the end-of-message signal terminating the message being transmitted.

The end-of-message signal consists of three consecutive carriage return characters followed by a letters character. In response to the first carriage return character, relay C1C operates followed by the operation of C2C and in response to the next carriage return character, relays C3C and C4C operate followed by the operation of relays C5C and C6C in response to the third carriage return character whereupon relay TFR is operated followed by the operation of relay CDR which opens the clutch magnet to distributor 23. This causes relays CSR, SIS and FSR to release which is followed by the operation of relay FCA and the release of relay STR.

Relay FPC will next be operated and in operating completes the circuit for the operation of FTR. The latter in operating interrupts the circuit to relay CDD to cause the operate lamp 58 to go out. Relay FHA releases next followed by the release of relay CLS–2 and the release of relays C1C to C6C. The next relay to release is relay CRS followed by the release of relay CRD and at this time a circuit is recompleted to the clutch magnet of distributor 23 to enable it to control the transmitter 24 to idle letter characters in the tape therethrough.

Thus, the circuits are returned to their normal condition ready to be operated in conjunction with the transmission of a following message in the tape 22. When the first character of the following message is destined for the same destination as the preceding message, the key 33 will be depressed and if channel A to the common destination happens to be busy transmitting a message from some other transmitter, another channel to the destination such as channel B will be selected if idle. For example, if channel A should be busy as indicated by the release of its FTR relay, the start lead such as 51 from the operating position desiring to establish a connection to the multichannel destination will be transferred through back contacts of A channel's FTR relay to the FTR relay of channel B. If channel B is idle the start circuit initiates its associated rotary switch, corresponding to rotary switch 55 of channel A to hunting for the marked point on the lower level thereof. The mark leads, such as lead 56 from an operating position are multiplied to respective points on each of the rotary switches such as 55 of the multichannel equipment and hence such points are marked simultaneously.

A feature of the invention resides in an arrangement whereby the channels of a multichannel group can be selected either in rotation or on the basis of availability with certain channels having preference over others. Such an arrangement is highly advantageous in that during peak load periods the load is distributed to the available channels, whereas in times of light loads, the messages can be concentrated in a smaller number of channels. For example, in periods of peak load each channel would have substantially the same number of messages transmitted thereover whereas when operating on the basis of availability, channel A to a destination would be selected if available, and channel B would only be selected when channel A was busy, and channel C selected only when channels A and B both were busy.

To control the seizure of the channels of a group on a rotational basis or a first available basis, channel priority switches such as 66a, 66b and 66c are provided, one with the channel equipment of each channel to a multichannel destination. In the channel equipment for channels B and C, only the detailed circuits essential to the channel priority switch are disclosed, it being understood each has a duplicate of the complete circuits shown for channel A. With a channel priority switch such as 66a thrown to the left or R position for selection of the channels to the common destination on a rotational basis, the start circuits from the operating position are transferred to the next higher available channel equipment as each channel is seized. When the last channel is seized, such as channel C in a three-channel group, the start circuits are transferred to the first or A channel again. This is accomplished in part by the channel priority control relay FPC and associated transfer relay FTR staying released until all other channels have been seized or closed out.

When the A channel of a group is seized and its SIS relay operated, the associated FCA and FPC relays release. The FPC relay is held in an unoperated condition by a ground on the battery side of the coil thereof from the priority switch 66 and a back contact of the FPC relay in the next channel equipment which would be the FPC relay of channel B when channel A is seized. When the B channel is seized both the FPC relays of the channel equipment for channels A and B are held unoperated by a ground from the C channel priority switch. When all the channels are seized the last ground is removed which held the FPC relays unoperated and as the channels become idle, the associated FCA relays operate. The FCA relay for the first idle channel operates and locks in on its own contacts. The next higher channel FPC relay will not operate until this or the first idle channel is seized and the associated FCA relay closes contacts thereof. Thus the several channels to a multichannel destination are seized in rotation when available and the load is substantially evenly distributed over the various channels.

With the channel priority switches 66 of a multichannel group all thrown to the right or FA, first available position, the start circuits from the operating positions will always be connected to the first available channel; for example, channel A if idle but channel B if channel A is busy, etc. This is accomplished by operating relay FPC and relay FTR when the seize circuit is released. When the channel becomes idle, relay FCA operates and completes a circuit to ground at the A channel equipment causing relay FPC to operate.

Relay FPC could be held unoperated by a ground on the battery side of the coil thereof which is the condition when one of the FSA, FSB or FSC relays is operated, which have make contacts thereof grounded, the tongues of which are connected in parallel to a tongue of relay FPC. This would be the condition if a start circuit were completed to a channel and hunting was taking place at this time. For such condition one of the FSA, FSB or FSC relays would be operated. Closed contacts on a relay operated by the start circuit would ground the coil of relay FPC preventing any change in the first available channel until the circuit had been established. Thus a start circuit can not jump to another first available channel after a lower channel becomes available just after hunting for an available channel started.

While the invention has been described in but the preferred embodiment thereof, it will be apparent that various modifications may be made therein without departing from the scope and essential attributes thereof, and it is desired therefore that only such limitations be placed thereon as are imposed by the appended claims.

What is claimed is:

1. In a telegraph system, a central office, a plurality of remote offices each one having a plurality of concurrently operable individual channels of communication extending thereto from said central office, a plurality of signal storage devices at said central office for storing messages to be transmitted with each of said devices having a transmitting means individual thereto, a separate set of manually operable elements with one element only for each remote office individual to each transmitting means and means controlled by the operation of any one of said elements to connect its respective transmitting means to the representative remote office over any idle one of the plurality of channels of communication thereto with said connection being independent of the other of said channels to said remote office.

2. In a telegraph system, a central office, a plurality of remote offices each one having a plurality of concurrently operable individual channels of communication extending thereto from said central office, a plurality of signal storage devices at said central office for storing messages to be transmitted with each of said devices having an individual transmitting means, a separate set of manually operable elements with one element only for each remote office individual to each transmitting means, means controlled by the operation of any one of said elements to connect said transmitting means to the representative remote office over any one of the plurality of channels of communication thereto with said connections being independent of the others of said channels to said remote office, and means to control the order in which the plurality of channels of communication to a remote office are connected to said transmitting means.

3. In a telegraph switching system comprising a central office and a plurality of remote offices, a plurality of concurrently operable individual telegraph signal transmission circuits extending from some of said remote offices to said central office and single circuits from the other of said remote offices to said central office, a plurality of telegraph message transmitters at said central office, selective switching equipment at said central office, one manually selectable element for each of said remote offices individual to each of said transmitters, means including said elements for controlling said switching equipment to connect respective transmitters individually to said transmission circuits and means including said switching equipment to connect said transmitters to the circuits of a multi-circuit remote office in a predetermined order.

4. In a telegraph switching system comprising a central office and a plurality of remote offices, a plurality of independently and concurrently operable telegraph signal transmission circuits extending from each one of said remote offices to said central office, a telegraph message transmitter at said central office, a separate manually selectable element at said central office for each of said remote offices, switching means controlled by said selectable elements for connecting said transmitter to one of said remote offices at a time over an idle one of said circuits, and means to employ the transmission circuits to a remote office in turn when connecting said transmitter thereto when more than one is idle.

5. In a telegraph exchange system, a central office, a plurality of remote offices, a plurality of concurrently operable telegraph signal transmitting channels from said central office to each one of said remote offices, a plurality of signal transmitters at said central office, a separate group of remote office representing manually selectable elements for each transmitter, one element for each remote office in each group, means initiated on the operation of one of said elements to connect its transmitter to the representative remote office, means to invariably establish said connection over a predetermined one of the channels to a remote office if idle and if busy to establish the connection over another one of said channels.

6. In a telegraph exchange system, a central office, a plurality of remote offices, a plurality of concurrently operable telegraph signal transmitting channels from said central office to each one of said remote offices, a plurality of signal transmitters at said central office, a separate group of remote office representing manually selectable elements for each transmitter, one element in each group for each remote office, means initiated on the operation of one of said elements to connect its transmitter to the representative remote office, means to establish such connections to a given remote office over the channels thereto in turn if idle and to the next channels in rotational order when a channel is busy at the time an element is operated.

7. In a telegraph system, a central office having a plurality of concurrently operable communication channels to each of a plurality of remote offices, a plurality of message transmitters at said central office for transmitting messages over said channels, separate groups of manually selectable elements, one element for each remote office, for each transmitter, switching means for connecting any one of said transmitters at a time with any one of said channels, and means responsive to the selection of any one of said elements to control said switching means to connect its transmitter with the element representing remote office over a predetermined one of the plurality of communication channels thereto if idle and over another one of said channels if idle when said predetermined channel is busy.

8. In a telegraph system, a central office having a plurality of concurrently operable communication channels to each of a plurality of remote offices, a plurality of message transmitters at said central office for transmitting messages over said channels, separate groups of manually selectable elements, one element for each remote office, for each transmitter, switching means for connecting any one of said transmitters at a time with any one of said channels, means responsive to the selection of any one of said elements to control said switching means to connect its transmitter with the element representing remote office over a predetermined one of the plurality of communication channels thereto if idle and over another one of said channels if idle when said predetermined channel is busy, and means to automatically connect said transmitter with the first channel to become idle when all the channels to a remote office are busy at the time of selecting the remote office selecting element.

9. In a telegraph system, a central office, a code signal message transmitter, a plurality of concurrently operable outgoing channels arranged in groups with each group terminating in different remote offices, a switching mechanism, a selectable element for each remote office, means responsive to the selection of any one of said elements to control said switching mechanism to connect said transmitter to the representative remote office over an idle one of the channels thereto, multiple conductor plugs and jacks for combining said outgoing channels with said switching mechanism and means including said plugs and jacks for varying the number of channels from said central office to any one of said remote offices.

10. In a telegraph system, a central office, a code signal transmitter, a switching mechanism associated with said transmitter, a plurality of remote offices each having a group of concurrently operable channels extending thereto from said central office, an individual channel transmitting control unit for each of said channels at said central office, individual selectable elements at said central office for each of said remote offices, means operative on the selection of one of said elements to control said switching mechanism to connect said transmitter with its representative remote office over one of the channels of the group extending thereto, said channel control units having means for combining additional control units therewith and means including said last means whereby the number of channels to a remote office can be varied.

11. In a telegraph system, a central office, a code signal transmitter, a switching mechanism associated with said transmitter, a plurality of remote offices each having a group of concurrently operable channels extending thereto from said central office, an individual channel transmitting control unit for each of said channels at said central office, indvidual selectable elements at said central office for each of said remote offices, means operative on the selection of one of said elements to control said switching mechanism to connect said transmitter with its representative remote office over one of the channels of the group extending thereto, said channel control units having means for adding additional control units therewith and means including said last means whereby the number of channels to a remote office can be varied, each of said channel control units having in and out control circuits thereto terminating in multiple conductor plugs and sockets, and means including said plugs and sockets for adding and removing channel control units from a group of channels to a remote office.

References Cited in the file of this patent

UNITED STATES PATENTS

| | | |
|---|---|---|
| 2,417,369 | Luhr | Mar. 11, 1947 |
| 2,529,166 | Lesigne | Nov. 7, 1950 |
| 2,546,627 | Blanton et al. | Mar. 27, 1951 |
| 2,546,630 | Currie et al. | Mar. 27, 1951 |
| 2,632,043 | Blanton | Mar. 17, 1953 |
| 2,673,234 | Lesigne | Mar. 23, 1954 |
| 2,766,318 | Bacon | Oct. 9, 1956 |